United States Patent [19]

Burrus et al.

[11] 4,132,453

[45] Jan. 2, 1979

[54] TURBINE METER BEARING

[75] Inventors: Billy S. Burrus; Michael W. Woodfill, both of Tulsa, Okla.

[73] Assignee: Combustion Engineering, Inc., Windsor, Conn.

[21] Appl. No.: 825,798

[22] Filed: Aug. 18, 1977

[51] Int. Cl.² .......................... F16C 9/00; G01F 1/10
[52] U.S. Cl. .................................. 308/238; 73/231 R; 308/DIG. 8
[58] Field of Search ............. 308/237 R, 238, DIG. 8; 73/231 R, 231 M

[56] References Cited

U.S. PATENT DOCUMENTS

| | | | |
|---|---|---|---|
| 3,878,718 | 4/1975 | Sugiyama et al. | 73/231 R |
| 3,972,233 | 8/1976 | Pelt et al. | 308/DIG. 8 |
| 3,999,885 | 12/1976 | Harris et al. | 73/231 R |
| 4,000,932 | 1/1977 | Harris et al. | 308/237 |
| 4,012,958 | 3/1977 | Taylor | 73/231 R |

Primary Examiner—Galen L. Barefoot
Assistant Examiner—Charles E. Frankfort
Attorney, Agent, or Firm—Arthur L. Wade

[57] ABSTRACT

The rotor of a turbine meter has two ceramic bushings and is mounted on a pair of ceramic shafts, each shaft extending from a spider support. A ceramic washer is mounted in each spider support and about the shaft extending from the support to provide ceramic-to-ceramic bearing for the rotor in both directions of fluid flow through the meter.

3 Claims, 1 Drawing Figure

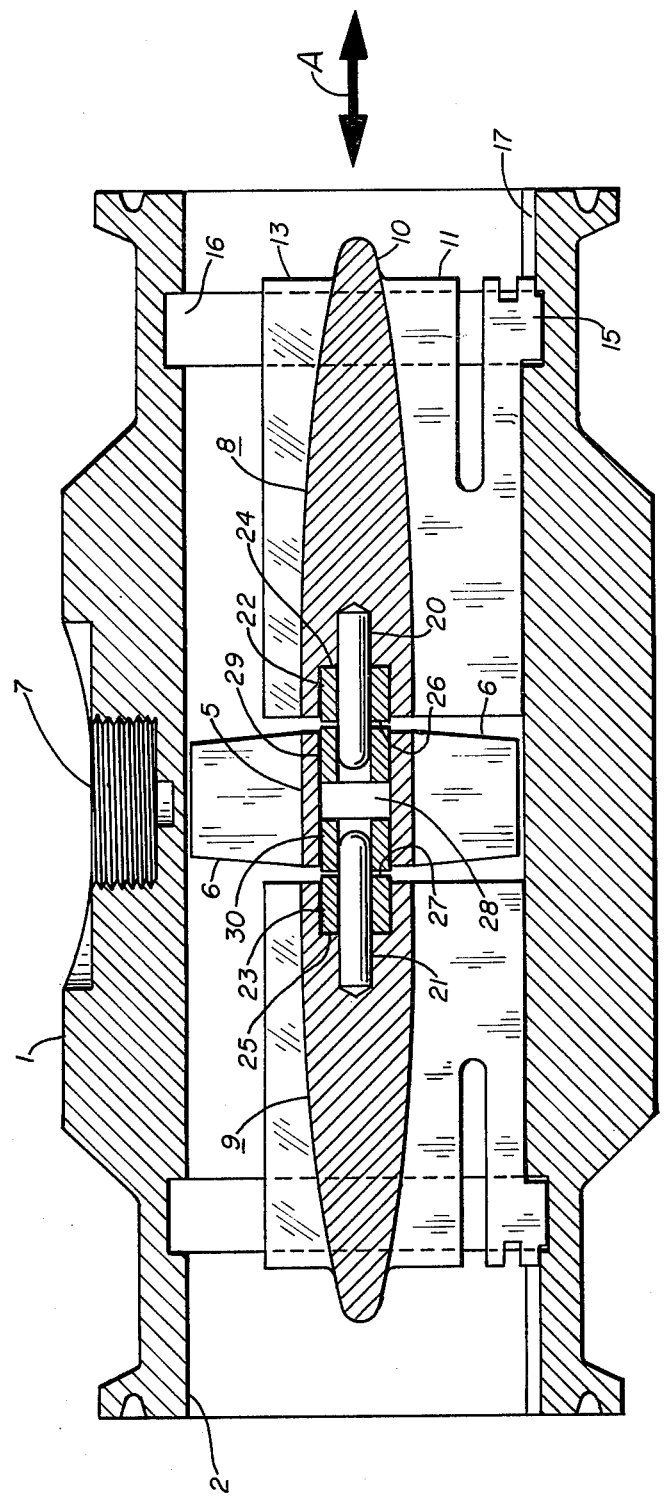

TURBINE METER BEARING

BACKGROUND OF THE INVENTION

There has always been, and will always be, pressure for improvements to the bearings of turbine meter rotors. One, there is the overhanging need for a bearing which will provide for flow reversals. Lubrication will never be completely satisfactory. Now the sanitary market requires more simplicity to reduce retention of food in which harmful bacteria will develop. All configurations of turbine meter structure are being redesigned to get the simple form which will not harbor collections of food-fluids metered or which can be readily flushed clean of this residue.

The food industry is active in establishing standards for meter structures which must be brought into direct contact with food. No turbine meter design has been given an universal stamp of approval. This art has the problem of providing the meter function with structure which is simple enough to meet the evolving sanitary standards of industry as they apply to measurement.

The turbine meter disclosed in U.S. Patent Harris et al., U.S. Pat. No. 4,000,932 has been satisfactory in the range of small flow line sizes, i.e. ¾ to 2". However, there are some indications that the structure becomes unstable in the sizes above 2 inches. Additional support must be provided for the rotor to stabilize the structure. The ceramic bearing surfaces, as provided in the disclosure U.S. Pat. No. 4,000,932, remains a high-water mark of this feature of meter development which must be combined with the additional rotor support.

SUMMARY OF THE INVENTION

The present invention contemplates a turbine meter with a conduit form of housing having a bore in which is mounted two spider structures from which additional support is provided a rotor contacted directly by the flow of fluid through the bore. A ceramic shaft extends from each spider structure toward each other. The rotor has a pair of bushings of ceramic material mounted axially in the rotor and journalled over the shafts. A washer of ceramic is mounted about each shaft and in the spider structure to provide a bearing surface for the ceramic bushing in preserving ceramic-to-ceramic bearing surfaces in both directions of fluid flow through the meter.

Other objects, advantages and features of this invention will become apparent to one skilled in the art upon consideration of the written specification, appended claims, and attached drawings.

DESCRIPTION OF THE DRAWINGS

The drawing is a sectioned elevation in perspective of a turbine meter body with a rotor bearing in which the present invention is embodied.

DESCRIPTION OF THE PREFERRED EMBODIMENT

Referring to the drawing, there is disclosed a flanged body of a turbine meter. Body 1 is essentially a conduit with a central bore 2 through which fluids to be metered are flowed. Arrow A is double-headed to emphasize that fluid flow is to be expected in both directions through bore 2.

The primary element of the meter which responds to the fluid flow is rotor 5. It is basically the object of the invention to support rotor 5 on a bearing within bore 2 so it will rotate in response to the fluid flow. The rotor vanes 6 each cut magnetic lines of force sustained by a pickup element (not shown) mounted in well 7. The frequency at which the lines of force are cut becomes a measure of the fluid flow rate through bore 2.

Rotor 5 has the general description of a casing of cylindrical shape from which the rotor vanes 6 radiate from their attachment to the external surface of the casing. The specific bearing and shaft support for this rotor-casing 5 embodies the concepts of the present invention.

Spiders 8 and 9 each comprise a central, elongated body and vanes radiating outward to engage the walls of bore 2. Refer to spider 8. Body 10 may be cast with vanes 11, 12 (not shown) and 13 as an extended part of the body. There could be more, but usually three vanes are adequate for the required stability for rotor 5.

It is evident that all three vanes 11, 12 and 13 of spider 8 extend to the wall of bore 2. Vane 11 has an extension structure which engages a groove system in the bore wall. Specifically, extension 15 on vane 11 fits down into both circumferential groove 16 and longitudinal groove 17. This extension and groove engagement effectively fixes the vane 11, and its entire spider 8, at the desired location for support of the bearing for rotor 5.

The stark simplicity of the grooves and vane extension inherently militate against the dreaded collection of food material in which bacteria develops to contaminate. Also, the same simplicity of structure for the rotor bearing keeps it clean or readily flushed of food which has passed through bore 2. Compared with the complexity of prior art bearing structures, the present bearing structure disclosed is readily cleaned and has a minimal "catching" function. The arrangement gives a stable, rugged, dependable support for the bearing of rotor 5. At the same time the support structure meets the developing standards for a "sanitary" turbine meter. At this point in time no other known, commercially available, turbine meter structure is accepted by the food industry for the service of metering food fluids. Now, the present invention makes a significant breakthrough in this particular art.

Having cleared the preliminaries and given the proper setting, the present invention is now hopefully disclosed with simplicity and clarity. The structure embodying the invention is in the bearing for rotor 5. As stated, and indicated supra, there are many forms of bearings and bearing supports, in the prior art. Some bear superficial comparison to the embodiment of this invention. However, there are marked differences which amount to a significant advance in the art.

First, it has been established that cobalt binder in tungsten carbide is readily leached away by caustic cleaning compounds. Through systematic engineering, the reduction of the binder was a promise to meet the caustic attack on bearings of tungsten carbide. However, it was discovered that ceramics have inherently better bearing characteristics than tungsten carbide. The ceramics also use a binder, but this binder can also be reduced. In the final analysis, ceramic proves to be the more satisfactory bearing material for rotor 5.

Having established ceramics as the more satisfactory material, a form and arrangement for the larger sizes of meters was conceived as including shafts extended from the spider 8 and 9 in dual support of rotor 5. Specifically, shafts 20 and 21 are set into axial bores of spiders 8 and 9. The shafts extend from the bores in their spiders toward each other and into the rotor 5 for its dual support.

A washer of ceramic material is placed about each shaft 20 and 21. Specifically, washer 22 is placed about shaft 20 and washer 23 about shaft 21. Counterbores 24 and 25 are formed in the spiders 8 and 9 and washers 22 and 23 fit into these recesses. This arrangement provides support for the back and edge of each washer so it can present a firm, bearing surface normal to the axis of the supports. Bearing surface 26 is provided by washer 22 and bearing surface 27 is provided by washer 23. It is against these ceramic bearing surfaces the rotor 5 is brought as fluid flowing through the meter forces the rotor in the direction of fluid flow.

As rotor 5 is rotated and forced against the surface of washer 23, or washer 24, what part of rotor 5 is brought into direct contact with the washer surface in bearing contact? The bearing surface of one of the ceramic surfaces of a bushing in rotor 5 is the answer.

Rotor 5 has two bushings mounted in each end of its bore 28. As viewed in the drawings, bushing 29 is set into the right end of bore 28 and bushing 30 in the left end of bore 28. The bushings are cylinders. They protrude from bore 28 far enough to provide the only surfaces of rotor 5 which will come into contact with the washers 22 and 23. Made of the same ceramic material of which both the washers and shafts are formed, there is created ceramic-to-ceramic bearing surfaces for rotor 5 as it rotates with the fluid flowing through the meter.

The bushings as disclosed are separated from each other, fitted as they are into each end of bore 28. The shafts 20, 21 are extended only part way into the bores of the bushings to reduce the alignment problems when the assembly is brought together.

The complete assembly of spiders and rotor, with their bearings of shafts, washers and bushings of ceramic provide a simple, clean strucuture which offers a minimum of opportunity to retain food-fluids and which is readily flushed in periodic cleaning. In distinguishment from the prior art, the meter can be defined as having a conduit form of housing in which two spider supports are mounted. Each spider support has a ceramic shaft. These shafts are aligned and extend toward each other along the axis of the conduit housing. A rotor is positioned to receive both shafts from opposite directions and in ceramic bushings fitted into a bore through the rotor. A ceramic washer is mounted about each shaft and is fitted into a counterbore of the spider from which the ceramic shaft axially extends. The flat surfaces of the washers and flat surfaces of the rotor bushings then become the basic bearing surface as the rotor rotates on the shafts. The entire assembly is simple and rugged with a low frictional engagement of its movable parts.

At least one consolidation of the bearing parts must be made clear. The washers and shafts of ceramic are specifically disclosed in the drawing as separate structures. However, it is certainly possible for each washer and its companion shaft to be formed of a single piece of ceramic and fitted into a counterbore of its spider. At present it is contemplated that each ceramic part will be centered into place in the end of its spider, but there is no reason why a single body could not be formed to function as a shaft for the rotor and bearing for its bushing.

Structuring definitions of the inventive concepts in the disclosure was difficult to couch in robust language within this particular art. As novel as the concepts are, they are embodied in structure which had to be described in limited and simplistic terms such as conduit housing, spider supports, shafts, washers, rotor and bushings. This was hardly a dramatic arsenal from which to select telling descriptions that would ring out the solid advances this invention made in the art. However, if words with a persuasive bite were unavailable, the words and phrases which were selected are hopefully clear and definite as the periphery of the scope of the present invention was carefully traced.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A turbine meter including, a conduit form of housing defining a bore through which fluid to be metered is flowed in either axial direction,
   two spider supports mounted in the housing bore with the longitudinal axes thereof aligned with each other and with the axis of the housing bore,
   a shaft of ceramic material mounted in each spider support to extend toward each other and in alignment with the longitudinal axis of their respective spider supports,
   a washer body of ceramic material mounted in each spider support and providing a flat surface extending normal to the axis of the housing bore about each said shaft,
   a rotor positioned between the spider supports and engaged by the fluid flowing through the housing bore to cause rotation of said rotor, and
   bushing members of ceramic material mounted in each end of the rotor and having bores axially aligned to journal over said shafts,
   said bushing members protruding from the ends of said rotor and providing flat surfaces facing the flat surfaces of said ceramic washer bodies to provide a ceramic-to-ceramic bearing surface engagement for either direction of fluid flow through said housing bore.

2. The meter of claim 1 in which, the washer body of each spider support is mounted in a counter-bore formed to face outward from between the supports so as to back up the back and sides of the washer body as said flat surface of said washer body provides a bearing surface for the protruding flat surface of the bushing members of said rotor.

3. The meter of claim 1 in which,
   the rotor has a straight and cylindrical bore axially aligned with the shafts of the spider supports,
   and the bushing members are each cylindrical in shape and fitted into each end of the rotor bore to journal over one of the shafts as the support upon which the rotor turns when contacted by the fluid flowing through the conduit.

* * * * *